US012603573B2

(12) United States Patent
Mackay et al.

(10) Patent No.: US 12,603,573 B2
(45) Date of Patent: Apr. 14, 2026

(54) SWITCH BOOTSTRAPPING FOR MULTI-LEVEL INDUCTIVE POWER CONVERTER

(71) Applicant: Cirrus Logic International Semiconductor Ltd., Edinburgh (GB)

(72) Inventors: Graeme G. Mackay, Austin, TX (US); Jin-Jyh Su, Austin, TX (US); Hasnain Akram, Austin, TX (US); Changjong Lim, Gyeonggi-do (KR); Dave Marshnil, Cupertino, CA (US)

(73) Assignee: Cirrus Logic Inc., Austin, TX (US)

( * ) Notice: Subject to any disclaimer, the term of this patent is extended or adjusted under 35 U.S.C. 154(b) by 259 days.

(21) Appl. No.: 18/628,007

(22) Filed: Apr. 5, 2024

(65) Prior Publication Data

US 2024/0356441 A1      Oct. 24, 2024

Related U.S. Application Data

(60) Provisional application No. 63/497,281, filed on Apr. 20, 2023.

(51) Int. Cl.
| | |
|---|---|
| *H02M 1/08* | (2006.01) |
| *H02M 3/07* | (2006.01) |
| *H02M 3/158* | (2006.01) |

(52) U.S. Cl.
CPC ............. *H02M 3/158* (2013.01); *H02M 1/08* (2013.01); *H02M 3/07* (2013.01)

(58) Field of Classification Search
CPC ........... H02M 3/158; H02M 1/08; H02M 3/07
See application file for complete search history.

(56) References Cited

U.S. PATENT DOCUMENTS

| | | | | |
|---|---|---|---|---|
| 11,601,049 | B2 * | 3/2023 | Jong | H02M 3/1584 |
| 11,750,093 | B1 * | 9/2023 | Han | H02M 3/07 |
| | | | | 363/13 |
| 2017/0331374 | A1 * | 11/2017 | Høyerby | H03F 3/183 |
| 2024/0429818 | A1 * | 12/2024 | Perreault | H02M 1/007 |
| 2025/0253772 | A1 * | 8/2025 | Maru | H02M 3/158 |
| 2025/0357844 | A1 * | 11/2025 | Jong | H02M 1/0095 |

* cited by examiner

*Primary Examiner* — Adolf D Berhane
(74) *Attorney, Agent, or Firm* — Jackson Walker L.L.P.

(57) ABSTRACT

A multi-level power converter configured to receive a power supply and generate an inductor current may include a first switch coupled to a first capacitor, a second switch coupled to a second capacitor, a third switch coupled to a third capacitor, a fourth switch, an inductor coupled to a switch node between the second switch and the third switch, and a flying capacitor having a first terminal coupled to a first node between the first and second switch and a second terminal coupled to a second node between the third and fourth switch, wherein the second capacitor is configured to share charge with at least one of the first capacitor and the third capacitor to enable non-gate terminals of at least one of the first switch, the second switch, and the third switch to replenish with charge at or approximate to a duty cycle extreme of the multi-level power converter.

10 Claims, 5 Drawing Sheets

SWITCH BOOTSTRAPPING FOR MULTI-LEVEL INDUCTIVE POWER CONVERTER

RELATED APPLICATION

The present disclosure claims priority to U.S. Provisional Patent Application No. 63/497,281, filed Apr. 20, 2023, which is incorporated by reference herein in its entirety.

FIELD OF DISCLOSURE

The present disclosure relates in general to circuits for electronic devices, including without limitation personal audio devices such as wireless telephones and media players, and more specifically, switch bootstrapping for a multi-level inductive power converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, haptic actuators, camera stabilization motors, and/ or other loads. Such circuitry often includes a driver including a power amplifier for driving an output signal to such loads. Oftentimes, a power converter may be used to provide a supply voltage to a power amplifier in order to amplify a signal driven to speakers, headphones, other transducers, or other loads. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier. A power converter may be used to provide supply voltage rails to one or more components in a device. A power converter may also be used in other applications besides driving audio transducers, such as driving haptic actuators or other electrical or electronic loads. Further, a power converter may also be used in charging a battery from a source of electrical energy (e.g., an AC-to-DC adapter).

One type of power converter is known as a multi-level power converter. Multi-level power converters may offer many benefits compared to conventional two-level converters, such as the capability of generating higher output voltages with lower voltage-rated switches and capacitors, as well as producing smoother output voltage waveforms by using more voltage levels and advanced modulation techniques. However, despite their advantages, multi-level power converters have disadvantages. For example, in a 3-level inductive power converter which uses n-channel metal-oxide semiconductor field-effect transistors as switches, some of the switches may require floating supply voltages to recharge nodes intermediate to the switches in order to ensure actuation of the switches. Such voltage bootstrapping of intermediate nodes may present challenges.

SUMMARY

In accordance with the teachings of the present disclosure, one or more disadvantages and problems associated with operation of multi-level converters at low load conditions may be reduced or eliminated.

In accordance with embodiments of the present disclosure, a multi-level power converter configured to receive a power supply and generate an inductor current may include a first switch coupled to a first capacitor, a second switch coupled to a second capacitor, a third switch coupled to a third capacitor, a fourth switch, an inductor coupled to a switch node between the second switch and the third switch, and a flying capacitor having a first terminal coupled to a first node between the first switch and the second switch and a second terminal coupled to a second node between the third switch and the fourth switch, wherein the second capacitor is configured to share charge with at least one of the first capacitor and the third capacitor to enable non-gate terminals of at least one of the first switch, the second switch, and the third switch to replenish with charge at or approximate to a duty cycle extreme of the multi-level power converter.

In accordance with these and other embodiments of the present disclosure, a method may be provided in a multi-level power converter configured to receive a power supply and generate an inductor current, wherein the multi-level power converter comprises a first switch coupled to a first capacitor, a second switch coupled to a second capacitor, a third switch coupled to a third capacitor, a fourth switch, an inductor coupled to a switch node between the second switch and the third switch, and a flying capacitor having a first terminal coupled to a first node between the first switch and the second switch and a second terminal coupled to a second node between the third switch and the fourth switch. The method may include configuring the second capacitor to share charge with at least one of the first capacitor and the third capacitor to enable non-gate terminals of at least one of the first switch, the second switch, and the third switch to replenish with charge at or approximate to a duty cycle extreme of the multi-level power converter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
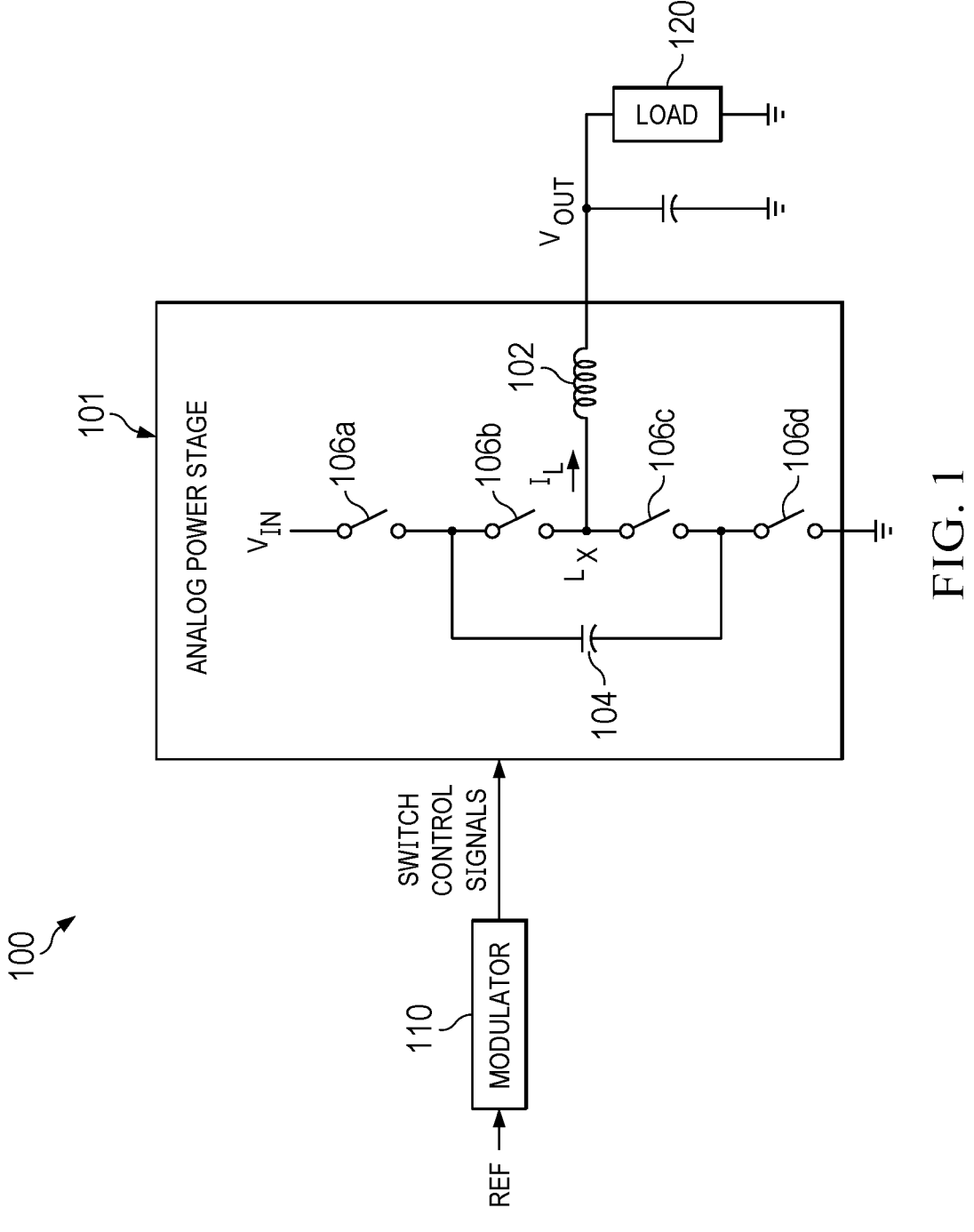
FIG. 1 illustrates a circuit diagram of selected components of an example circuit for driving a load using a 3-level power converter, in accordance with embodiments of the present disclosure.

FIG. 1 illustrates selected components of an example circuit 100 for driving a load 120, in accordance with embodiments of the present disclosure. As shown in FIG. 1, a modulator 110 may receive a control parameter REF (e.g., which may be a digital signal indicative of a desired output voltage $V_{OUT}$ to be driven to load 120 or desired current $I_L$ to be driven through a power inductor of the modulator), and based on such control parameter, generate switching control signals for controlling switches of an analog power stage 101, such as a power converter, for example.

One type of power converter often used in electronic circuits is a 3-level power converter. FIG. 1 depicts analog power stage 101 as a 3-level power converter, as is known in the art. As shown in FIG. 1, analog power stage 101 may receive an input voltage $V_{IN}$ and have an output configured to generate an output voltage $V_{OUT}$ based on switching signals received from modulator 110. Further, analog power stage 101 may include a switching node having a voltage $L_X$. Analog power stage 101 may include a power inductor 102 coupled between the switching node and the output. Moreover, analog power stage 101 may include a flying capacitor 104 having a first capacitor terminal and a second capacitor terminal. In addition, analog power stage 101 may include a plurality of switches 106a, 106b, 106c, and 106d, wherein switch 106a is coupled between the input and the first capacitor terminal, switch 106b is coupled between the first capacitor terminal and the switching node, switch 106c is coupled between the second capacitor terminal and the switching node, and switch 106d is coupled between the second capacitor terminal and a ground voltage. In operation, switches 106a, 106b, 106c, and 106d may be controlled by modulator 110 to regulate output voltage $V_{OUT}$ to a desired target voltage.

Figure 2A:
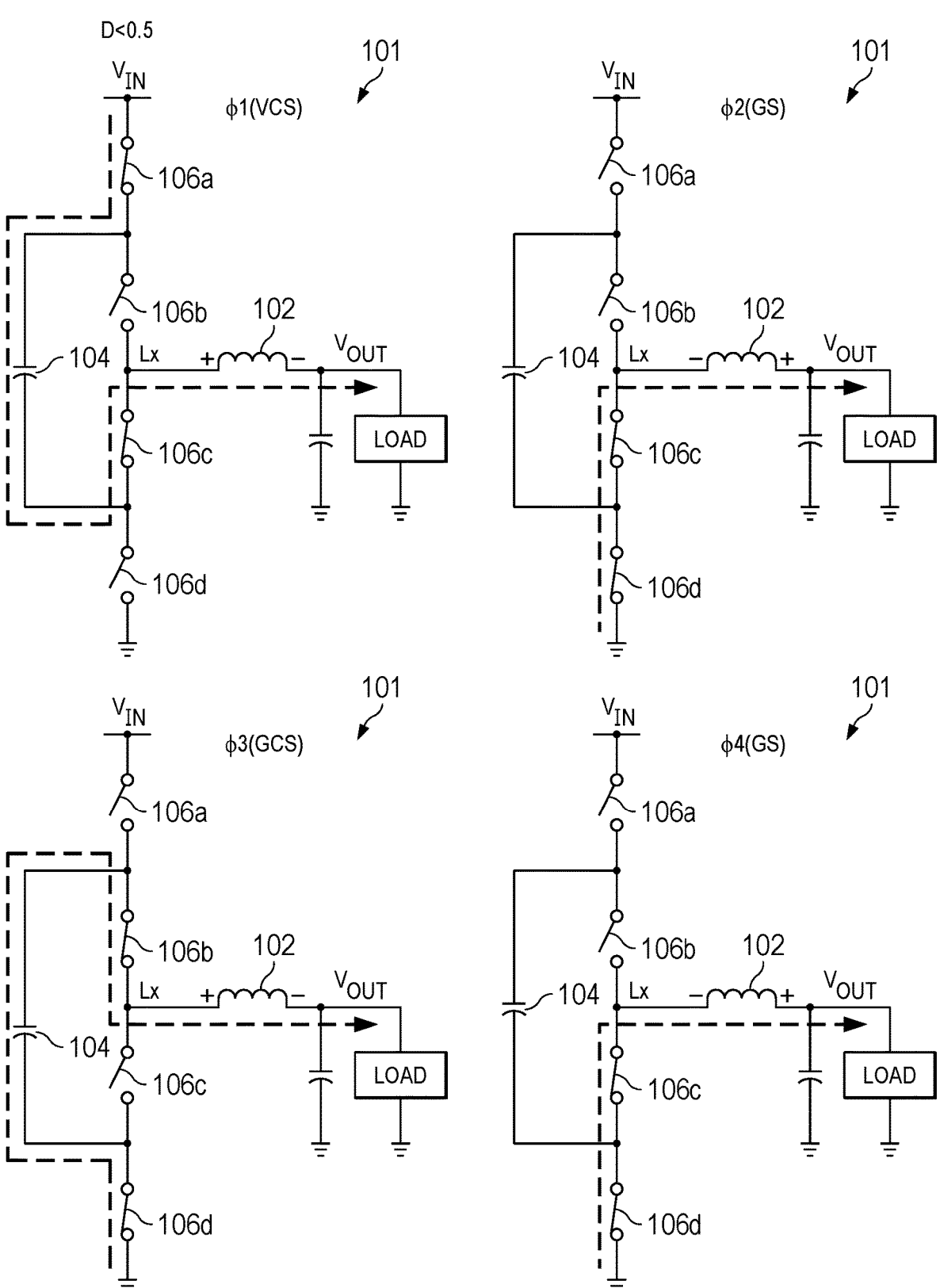
FIGS. 2A and 2B illustrate operation of the two-phase 3-level buck converter depicted in FIG. 1, in accordance with embodiments of the present disclosure.
Figure 2B:
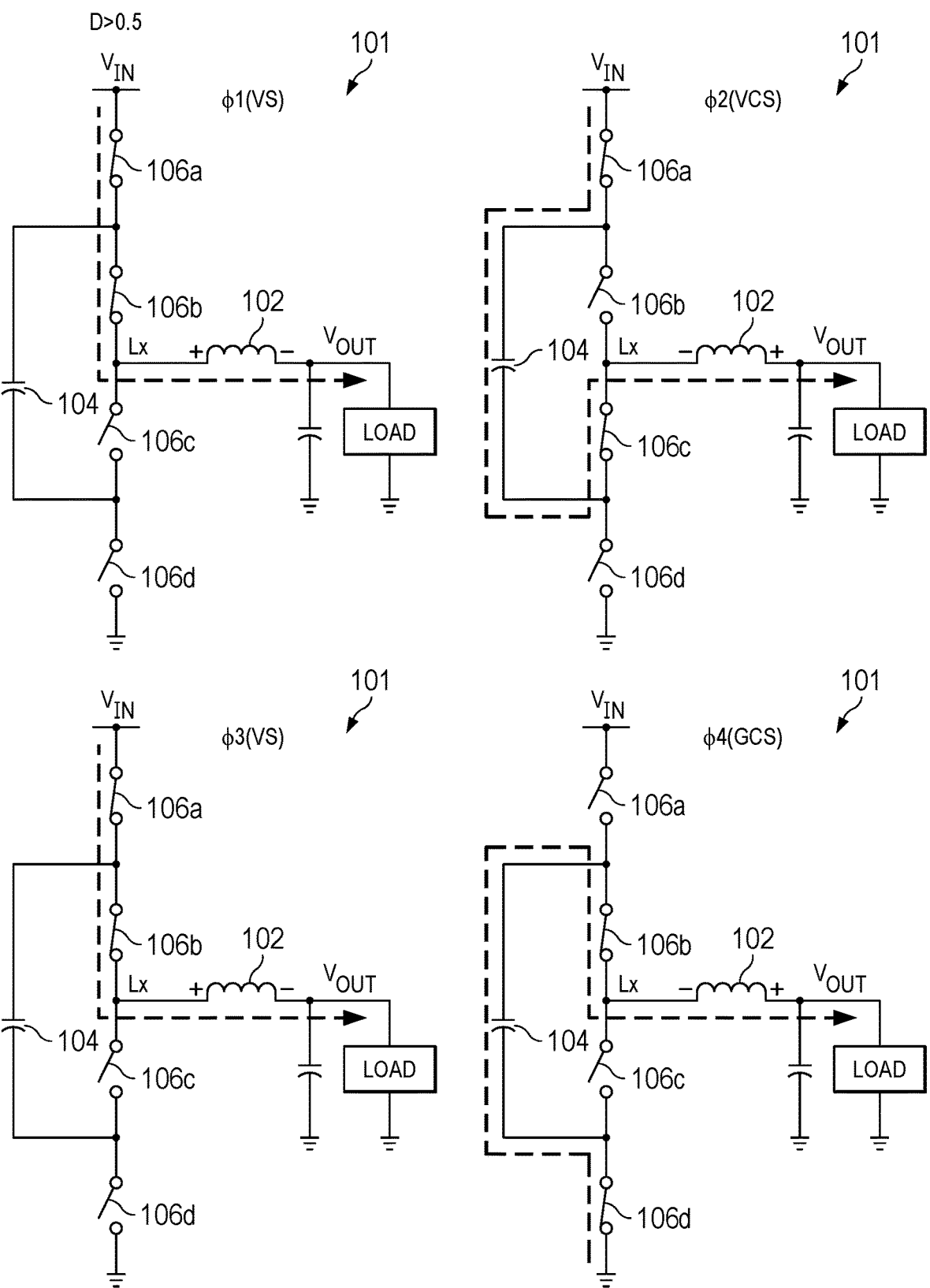

In operation, switches 106 may be controlled to regulate output voltage $V_{OUT}$ to a desired target voltage. As shown in FIGS. 2A and 2B, buck operation of analog power stage 101 may include cyclic, periodic commutation of switches 106 among a first state ($\varphi1$), a second state ($\varphi2$), a third state ($\varphi3$), and a fourth state ($\varphi4$). As shown in FIG. 2A, for duty cycles D of less than 0.5 (wherein $D=V_{OUT}/V_{IN}$), switches 106a and 106c may be activated (and switches 106b and 106d deactivated) during the first state in a VCS configuration, switches 106c and 106d may be activated (and switches 106a and 106b may be deactivated) during the second state in a GS configuration, switches 106b and 106d may be activated (and switches 106a and 106c may be deactivated) during the third state in a GCS configuration, and switches 106c and 106d may be activated (and switches 106a and 106b may be deactivated) during the fourth state in a GS configuration.

Further, as shown in FIG. 2B, for duty cycles D of greater than 0.5, switches 106a and 106b may be activated (and switches 106c and 106d deactivated) during the first state in a VS configuration, switches 106a and 106c may be activated (and switches 106b and 106d may be deactivated) during the second state in the VCS configuration, switches 106a and 106b may be activated (and switches 106c and 106d may be deactivated) during the third state in the VS configuration, and switches 106b and 106d may be activated (and switches 106a and 106c may be deactivated) during the fourth state in the GCS configuration.

The acronyms VS, VCS, GS, and GCS stand for the path of current in each of the respective configurations, wherein "V" stands for the voltage supply, "C" stands for flying capacitor 104, "S" stands for the switching node, and "G" stands for ground voltage.

Figure 3:
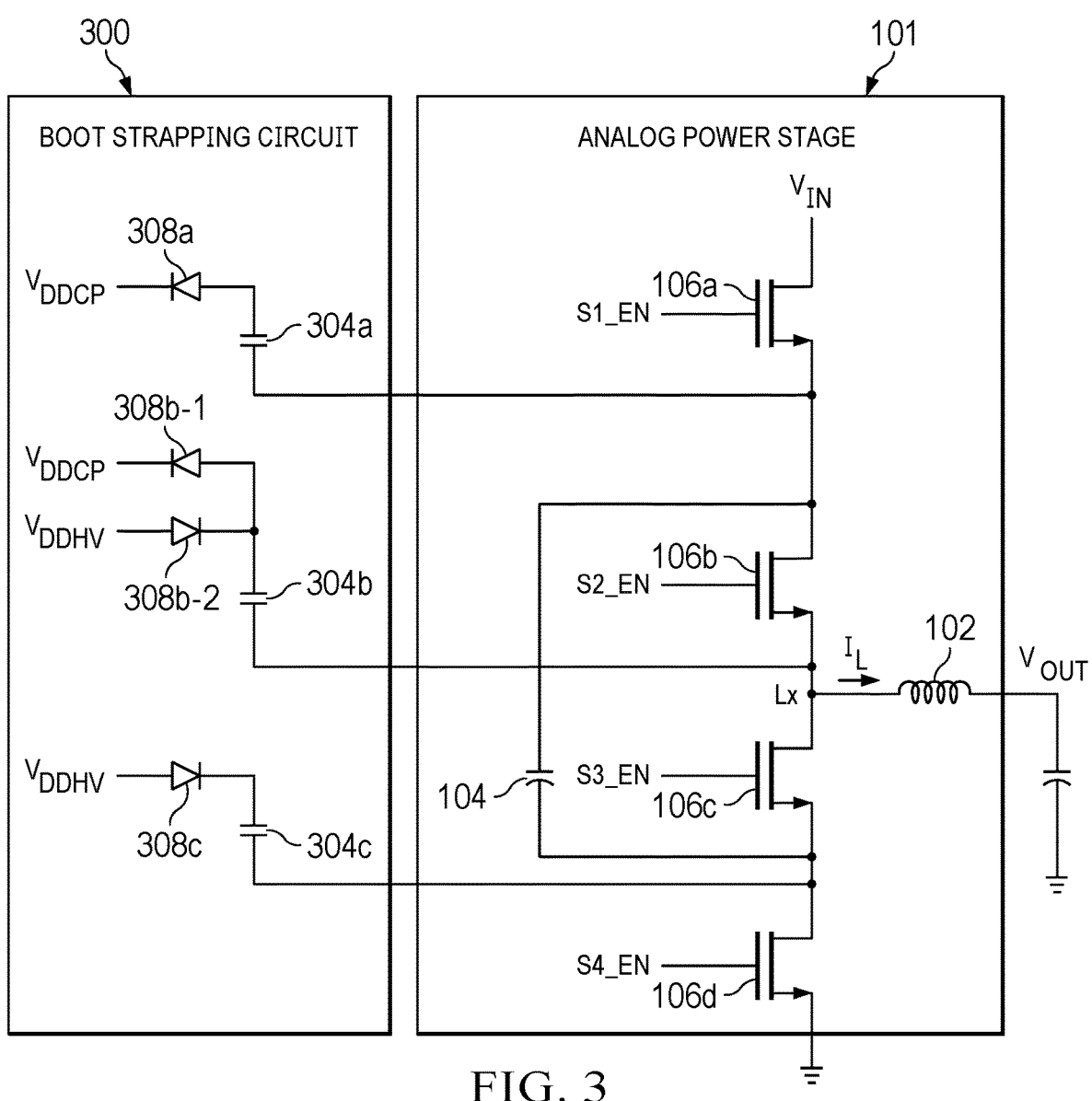
FIG. 3 illustrates a circuit diagram of selected components of an example circuit including the 3-level power converter of FIG. 1 and a bootstrapping circuit, in accordance with embodiments of the present disclosure.

FIG. 3 illustrates a circuit diagram of selected components of an example circuit including the 3-level power converter of analog power stage 101 and a bootstrapping circuit 300, in accordance with embodiments of the present disclosure. In FIG. 3, switches 106a, 106b, 106c, and 106d are represented by n-channel metal-oxide-semiconductor field-effect transistors (MOSFETs) that may be used to implement such switches. FIG. 3 also depicts switch control signals S1_EN, S2_EN, S3_EN, and S4_EN, which may be generated by modulator 110 of FIG. 1 and used to control switches 106a, 106b, 106c, and 106d, respectively.

For the purposes of clarity and exposition, no bootstrapping circuit is shown in FIG. 1, although the presence of a bootstrapping circuit such as bootstrapping circuit 300 of FIG. 3 or bootstrapping circuit 400 of FIG. 4 described below may be required to enable recharging of the intermediate nodes of switches 106a, 106b, 106c, and 106d to ensure such switches can be activated during switching.

As shown in FIG. 3, the intermediate node of switches 106a and 106b (i.e., the electrical node of the first terminal of flying capacitor 104) may be coupled via a bootstrap capacitor 304a to a supply-referenced voltage $V_{DDCP}$, with an anode of a diode 308a coupled to bootstrap capacitor 304a and a cathode of diode 308a coupled to supply-referenced voltage $V_{DDCP}$. Similarly, the intermediate node of switches 106b and 106c (i.e., the switching node of analog power stage 101 having voltage Lx) may be coupled via a bootstrap capacitor 304b to supply-referenced voltage $V_{DDCP}$, with an anode of a diode 308b-1 coupled to bootstrap capacitor 304b and a cathode of diode 308b-1 coupled to supply-referenced voltage $V_{DDCP}$. The intermediate node of switches 106b and 106c may also be coupled via a bootstrap capacitor 304b to supply-referenced voltage $V_{DDHV}$, with a cathode of a diode 308b-2 coupled to bootstrap capacitor 304b and an anode of diode 308b-2 coupled to supply-referenced voltage $V_{DDHV}$. Likewise, the intermediate node of switches 106c and 106d (i.e., the electrical node of the second terminal of flying capacitor 104) may be coupled via a bootstrap capacitor 304c to a supply-referenced voltage $V_{DDHV}$, with a cathode of a diode 308c coupled to bootstrap capacitor 304c and an anode of diode 308c coupled to supply-referenced voltage $V_{DDHV}$. Supply-referenced voltage $V_{DDCP}$ may be referenced to input voltage $V_{IN}$ and supply-referenced voltage $V_{DDHV}$ may be referenced to ground voltage.

In operation:
In the VCS configuration, switches 106b and 106d may be deactivated and switches 106a and 106c may be activated, and supply-referenced voltage $V_{DDCP}$ may be used to recharge the intermediate node of switches 106a and 106b.

In the GCS configuration, switches 106a and 106c may be deactivated and switches 106b and 106d may be activated, and supply-referenced voltage $V_{DDHV}$ may be used to recharge the intermediate node of switches 106c and 106d.

In the VS configuration, switches 106c and 106d may be deactivated and switches 106a and 106b may be activated, and supply-referenced voltage $V_{DDCP}$ may be used to recharge the intermediate node of switches 106a and 106b and the intermediate node of switches 106b and 106c.

In the GS configuration, switches 106a and 106b may be deactivated and switches 106c and 106d may be activated, and supply-referenced voltage $V_{DDHV}$ may be used to recharge the intermediate node of switches 106b and 106c and the intermediate node of switches 106c and 106d.

Notably, at low duty cycles (e.g., a duty cycle of approximately 0) of analog power stage 101, the GS configuration may dominate switching. At a duty cycle of approximately 0.25, switching may be split between approximately 50% of the time in the GS configuration and the other 50% of the time between the GCS and VCS configurations. At a duty cycle of approximately 0.75, switching may be split between approximately 50% of the time in the VS configuration and the other 50% of the time between the GCS and VCS configurations. At high duty cycles (e.g., a duty cycle of approximately 1), the VS configuration may dominate switching.

However, at a duty cycle of approximately 0.5, the GCS and VCS configurations may dominate switching. As a result, at a duty cycle of approximately 0.5, both non-gate terminals of switch 106b may not be reliably recharged due to very short periods of times in either of the VS or GS configurations.

Figure 4:
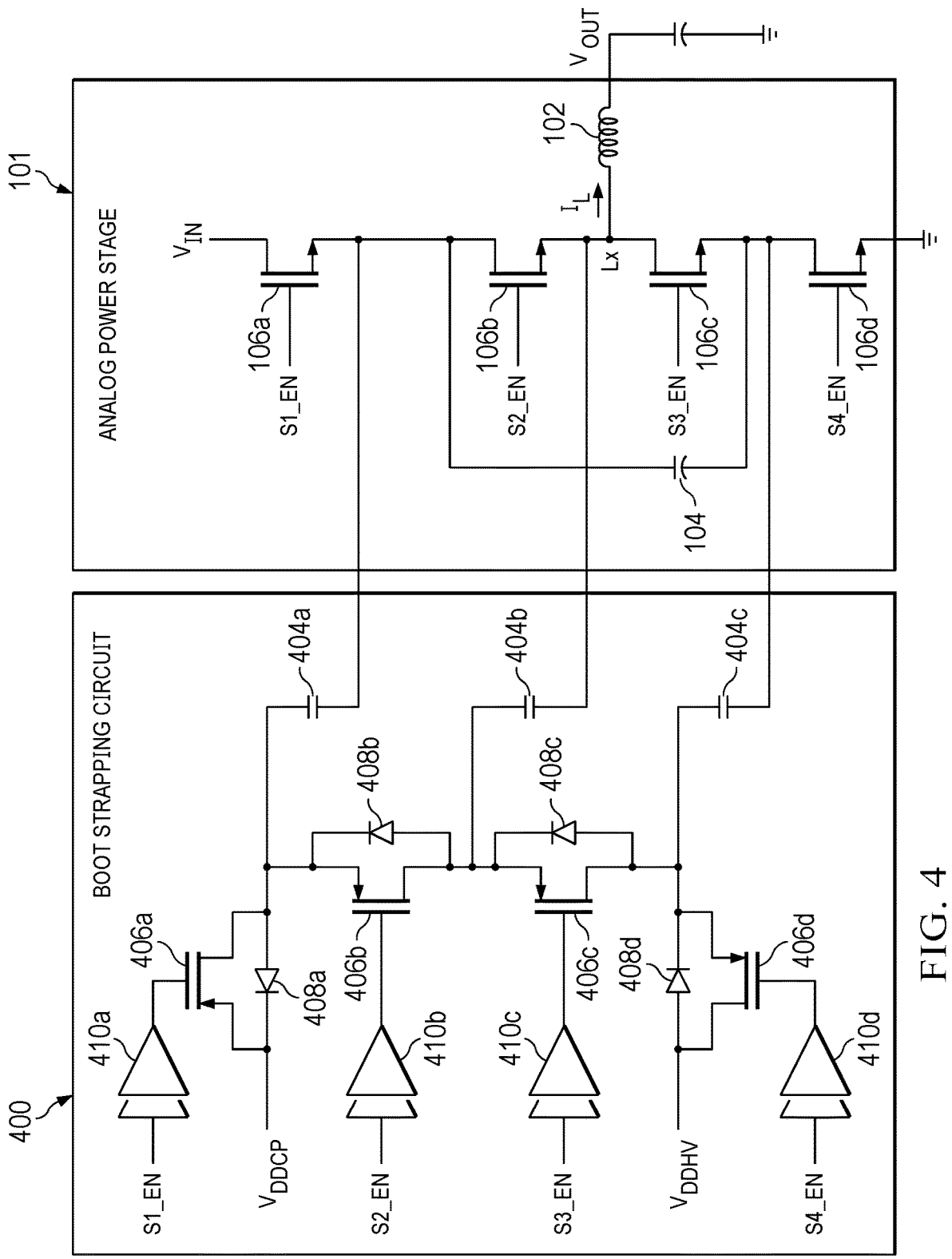
FIG. 4 illustrates another circuit diagram of selected components of an example circuit including the 3-level power converter of FIG. 1 and a bootstrapping circuit, in accordance with embodiments of the present disclosure.

FIG. 4 illustrates a circuit diagram of selected components of an example circuit including the 3-level power converter of analog power stage 101 and a bootstrapping circuit 400, in accordance with embodiments of the present disclosure. In FIG. 4, switches 106a, 106b, 106c, and 106d are represented by n-channel metal-oxide-semiconductor field-effect transistors (MOSFETs) that may be used to implement such switches. FIG. 4 also depicts switch control signals S1_EN, S2_EN, S3_EN, and S4_EN, which may be generated by modulator 110 of FIG. 1 and used to control switches 106a, 106b, 106c, and 106d, respectively.

As described in greater detail below, bootstrapping circuit 400 may, unlike bootstrapping circuit 300, provide for reliable recharging of switch 106b at duty cycles of approximately 0.5.

As shown in FIG. 4, the intermediate node of switches 106a and 106b (i.e., the electrical node of the first terminal of flying capacitor 104) may be coupled via a bootstrap capacitor 404a and a recharge switch 406a to a supply-referenced voltage $V_{DDCP}$, with an anode of a body diode 408a of recharge switch 406a coupled to bootstrap capacitor 404a and a cathode of body diode 408a coupled to supply-referenced voltage $V_{DDCP}$. Activation and deactivation of recharge switch 406a may be controlled by a delayed version of switch control signal S1_EN buffered by buffer 410a.

Similarly, the intermediate node of switches 106c and 106d (i.e., the electrical node of the second terminal of flying capacitor 104) may be coupled via a bootstrap capacitor 404c and a recharge switch 406d to a supply-referenced voltage $V_{DDHV}$, with an anode of a body diode 408d of recharge switch 406d coupled to bootstrap capacitor 404d and a cathode of body diode 408d coupled to supply-referenced voltage $V_{DDHV}$. Activation and deactivation of recharge switch 406d may be controlled by a delayed version of switch control signal S4_EN buffered by buffer 410d.

As also shown in FIG. 4, the intermediate node of switches 106b and 106c (i.e., the switching node of analog power stage 101 having voltage Lx) may be coupled via a bootstrap capacitor 404b and a recharge switch 406b to the intermediate node of bootstrap capacitor 404a and recharge switch 406a. A body diode 408b of recharge switch 406b may have its anode coupled to bootstrap capacitor 404b and its cathode coupled to bootstrap capacitor 404a. Activation and deactivation of recharge switch 406b may be controlled by a delayed version of switch control signal S2_EN buffered by buffer 410b.

The intermediate node of switches 106c and 106d may be coupled via a bootstrap capacitor 404c to the intermediate node of bootstrap capacitor 404c and recharge switch 406d. A body diode 408c of recharge switch 406c may have its anode coupled to bootstrap capacitor 404c and its cathode coupled to bootstrap capacitor 404b. Activation and deactivation of recharge switch 406c may be controlled by a delayed version of switch control signal S3_EN buffered by buffer 410c. Further, activation and deactivation of recharge switch 406d may be controlled by a delayed version of switch control signal S4_EN buffered by buffer 410d.

In operation:

In the VCS configuration, switches 106b and 106d may be deactivated and switches 106a and 106c may be activated, and supply-referenced voltage $V_{DDCP}$ may be used to recharge the intermediate node of switches 106a and 106b. Further, bootstrap switch 406c may be closed, such that bootstrap capacitor 404b shares charge with bootstrap capacitor 404c. For instance, if bootstrap capacitor 404c was previously charged from supply-referenced voltage $V_{DDHV}$, it may be able to replenish bootstrap capacitor 404b, for example at D=0.5. Conversely, if bootstrap capacitor 404b was previously charged, such as during the VS configuration at D=1, it may share charge with bootstrap capacitor 404c.

In the GCS configuration, switches 106a and 106c may be deactivated and switches 106b and 106d may be activated, and supply-referenced voltage $V_{DDHV}$ may be used to recharge the intermediate node of switches 106c and 106d. Further, bootstrap switch 406b may be closed, such that bootstrap capacitor 404a shares charge with bootstrap capacitor 404b. For instance, if bootstrap capacitor 404a was previously charged from supply-referenced voltage $V_{DDHV}$, it may be able to replenish bootstrap capacitor 404b, for example at D=0.5. Conversely, if bootstrap capacitor 404b was previously charged, such as during the VS configuration at D=1, it may share charge with bootstrap capacitor 404a.

In the VS configuration, switches 106c and 106d may be deactivated and switches 106a and 106b may be activated, and supply-referenced voltage $V_{DDCP}$ may be used to recharge the intermediate node of switches 106a and 106b and the intermediate node of switches 106b and 106c.

In the GS configuration, switches 106a and 106b may be deactivated and switches 106c and 106d may be activated, and supply-referenced voltage $V_{DDHV}$ may be used to recharge the intermediate node of switches 106b and 106c and the intermediate node of switches 106c and 106d.

Accordingly, the systems and methods described herein provide a 3-level converter power stage (e.g., analog power stage 101) configured to receiving a power supply (e.g., input voltage $V_{IN}$) and generate an inductor current (e.g., power inductor current $I_L$). The 3-level converter power stage may have a first switch (e.g., switch 106a) coupled to a first capacitor (e.g., bootstrap capacitor 404a), a second switch (e.g., switch 106*b*) coupled to a second capacitor (e.g., bootstrap capacitor 404*b*), a third switch (e.g., switch 106*c*) coupled to a third capacitor (e.g., bootstrap capacitor 404*c*), and a fourth switch (e.g., switch 106*d*). The 3-level converter power stage may also have an inductor (e.g., power inductor 102) coupled to a switch node (e.g., node having voltage Lx) between the second switch and the third switch and a flying capacitor (e.g., flying capacitor 104) having a first terminal coupled between the first switch and the second switch and a second terminal coupled between the third switch and the fourth switch. The second capacitor may share charge with at least one or more of the first and third capacitors so that non-gate terminals of at least one or more of the first switch, the second switch, and the third switch are able to replenish with charge at or close to a duty cycle extreme. For example, a duty cycle extreme may be a fifty percent duty cycle. As another example, a duty cycle extreme may be approximately a one hundred percent duty cycle. As a further example, a duty cycle extreme may be approximately a zero percent duty cycle. The second capacitor may share charge with both the first and third capacitors so that non-gate terminals of the first switch, the second switch, and the third switch all replenish with charge at or close to the duty cycle extreme.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A multi-level power converter configured to receive a power supply and generate an inductor current, the multi-level power converter comprising:
   a first switch coupled to a first capacitor;
   a second switch coupled to a second capacitor;
   a third switch coupled to a third capacitor;
   a fourth switch;
   an inductor coupled to a switch node between the second switch and the third switch; and
   a flying capacitor having a first terminal coupled to a first node between the first switch and the second switch and a second terminal coupled to a second node between the third switch and the fourth switch;
   wherein the second capacitor is configured to share charge with at least one of the first capacitor and the third capacitor to enable non-gate terminals of at least one of the first switch, the second switch, and the third switch to replenish with charge at or approximate to a duty cycle extreme of the multi-level power converter.

2. The multi-level power converter of claim 1, wherein the duty cycle extreme is a fifty percent duty cycle.

3. The multi-level power converter of claim 1, wherein the duty cycle extreme is a one hundred percent duty cycle.

4. The multi-level power converter of claim 1, wherein the duty cycle extreme is a zero percent duty cycle.

5. The multi-level power converter of claim 1, wherein the second capacitor is configured to share charge with the first capacitor and the third capacitor to enable non-gate terminals of the first switch, the second switch, and the third switch to replenish with charge at or approximate to a duty cycle extreme of the multi-level power converter.

6. A method in a multi-level power converter configured to receive a power supply and generate an inductor current, wherein the multi-level power converter comprises a first switch coupled to a first capacitor, a second switch coupled to a second capacitor, a third switch coupled to a third capacitor, a fourth switch, an inductor coupled to a switch node between the second switch and the third switch, and a flying capacitor having a first terminal coupled to a first node between the first switch and the second switch and a second terminal coupled to a second node between the third switch and the fourth switch, the method comprising:
   configuring the second capacitor to share charge with at least one of the first capacitor and the third capacitor to enable non-gate terminals of at least one of the first switch, the second switch, and the third switch to replenish with charge at or approximate to a duty cycle extreme of the multi-level power converter.

7. The method of claim 6, wherein the duty cycle extreme is a fifty percent duty cycle.

8. The method of claim 6, wherein the duty cycle extreme is a one hundred percent duty cycle.

9. The method of claim 6, wherein the duty cycle extreme is a zero percent duty cycle.

10. The method of claim 6, further comprising configuring the second capacitor to share charge with the first capacitor and the third capacitor to enable non-gate terminals of the first switch, the second switch, and the third switch to replenish with charge at or approximate to a duty cycle extreme of the multi-level power converter.

\* \* \* \* \*